US005241992A

United States Patent [19]

Oehlbeck et al.

[11] Patent Number: 5,241,992

[45] Date of Patent: Sep. 7, 1993

[54] APPARATUS AND METHOD FOR DISTRIBUTING FLUIDS

[75] Inventors: Douglas L. Oehlbeck; John R. Tinney, both of Rochester, N.Y.

[73] Assignee: Eastman Kodak Company, Rochester, N.Y.

[21] Appl. No.: 913,117

[22] Filed: Jul. 14, 1992

[51] Int. Cl.[5] .......... F16K 11/10

[52] U.S. Cl. .......... 137/897; 366/178; 366/182

[58] Field of Search .......... 137/1, 896, 897; 366/177, 178, 182

[56] References Cited

U.S. PATENT DOCUMENTS

| | | | |
|---|---|---|---|
| 2,190,896 | 2/1940 | Underwood | 259/96 |
| 2,190,897 | 2/1940 | Underwood | 259/96 |
| 2,254,127 | 8/1941 | Underwood | 259/96 |
| 2,392,542 | 1/1946 | Matuszak | 259/7 |
| 2,459,636 | 1/1949 | Fenney | 260/683.4 |
| 3,147,957 | 9/1964 | Martin | 259/96 |
| 3,415,650 | 12/1968 | Frame et al. | 96/94 |
| 3,630,636 | 12/1971 | Hill | 416/199 |
| 3,692,283 | 9/1972 | Sauer et al. | 259/24 |
| 3,702,619 | 11/1972 | Son | 137/896 X |
| 3,728,280 | 4/1973 | Sauer et al. | 252/314 |
| 3,925,243 | 12/1975 | Brogli et al. | 252/359 |
| 3,984,001 | 10/1976 | Nagano et al. | 209/3 |
| 4,140,299 | 2/1979 | Henderson et al. | 366/177 |
| 4,289,733 | 9/1981 | Saito et al. | 422/227 |
| 4,398,827 | 8/1983 | Dietrich | 366/178 X |
| 4,410,279 | 10/1983 | Howden et al. | 366/262 |
| 4,459,030 | 7/1984 | Weetman | 366/262 |
| 4,474,477 | 10/1984 | Smith | 366/178 X |
| 4,483,624 | 11/1984 | Bacon, Jr. et al. | 366/293 |
| 4,647,212 | 3/1987 | Hankison | 366/165 |
| 4,999,131 | 3/1991 | Shimizu | 366/178 X |

FOREIGN PATENT DOCUMENTS

| | | |
|---|---|---|
| 58289 | 12/1983 | Japan . |
| 275023 | 11/1987 | Japan . |

*Primary Examiner*—Robert G. Nilson
*Attorney, Agent, or Firm*—Carl F. Ruoff

[57] ABSTRACT

A fluid (liquid or gas) distributing apparatus comprises a series of annular conduits positioned concentrically and close to a region for mixing or performing a reaction. Each annular conduit has a plurality of orifices associated therewith which are spaced circumferentially and symmetrically proximate to the region and each orifice is positioned to deliver a liquid stream to the region. A feed line connects with a plurality of branch lines, each branch line connecting with one of the annular conduits. Valves in the lines control the flow of liquid to the annular conduits. The conduits in the series are arranged for use in the method of the invention in a sequence, beginning with the conduit of greatest flow resistance when the feed rate is low and continuing successively with the conduits of lower flow resistance as the fixed rate increases. The resulting uniform flow rates through the orifices and avoidance of back flow contribute to high yield and quality of product.

14 Claims, 5 Drawing Sheets

APPARATUS AND METHOD FOR DISTRIBUTING FLUIDS

FIELD OF THE INVENTION

This invention relates to an apparatus and method for distributing fluids and, more particularly, to such an apparatus and method for distributing a fluid stream to a mixing region in a vessel or pipeline.

BACKGROUND

In a simple type of conventional fluid mixing apparatus, a fluid is fed by a line or tube to a stirred vessel containing another liquid. Mixing equipment of this kind has been used for liquid phase chemical reactions and for physical mixing of liquids as in the formation of colloidal suspensions. Examples of mixing equipment are found in U.S. Pat. Nos. 4,289,733, 3,692,283, 3,415,650 and in Japanese Patent No. 58289 and Japanese Patent Application No. 275023. In addition to having mixing means that uniformly mix the fluids, it is desirable to feed the fluids to the mixers in a uniform manner. This is the subject of the present invention.

The making of silver halide photographic emulsions is an example of an operation that requires highly efficient distribution and mixing of liquids. As described in Chapter 3 of "*The Theory of the Photographic Process,*" 4th Edition, T.H. James, Editor, silver halide crystals or grains are precipitated and dispersed in a colloid or peptizer solution, which normally is gelatin. The silver halide is formed by the reaction of a solution of a halide salt, e.g., potassium bromide, with a solution of a silver salt, usually silver nitrate. Two common methods of mixing these components are the single-jet and double-jet methods.

In the double-jet method, aqueous solutions of the silver salt and the halide are added simultaneously by separate feed lines to a stirred vessel which contains the aqueous gelatin solution. With conventional apparatus the concentrations of reactants are not uniform throughout the process and the silver halide grain sizes and shapes vary considerably. For silver halide emulsions of the highest quality a narrow range of grain sizes and shapes is necessary. Even a small concentration of large grains in a fine grain emulsion can cause such problems as reduced photographic contrast or a defect known as "pepper fog." Similar problems occur in the single-jet technique using conventional apparatus wherein a silver nitrate stream is added to a gelatin solution which contains the alkali metal halide.

One way to improve the mixing of liquids is to feed the stream or streams to the mixing zone by means of a distributor having multiple orifices instead of by a single line or tube. See, for example, FIG. 4 of the patent to Brogli et al., U.S. Pat. No. 3,925,243. Although intended to improve distribution of the liquid stream, such a single distributor is not useful over a broad range of flow rates. For variations in feed rates, the diameter of the feed line and the cross-sectional area of the distributor channels and orifices must be large enough to provide an acceptable pressure drop at the highest flow rate to be encountered. Consequently, the velocity in the feed line and distributor orifices will be unacceptably low at the lowest flow rate. This can lead to axial mixing within the feed line, distributor channels and orifices themselves as a result of laminar flow or density inversions (if the reactant has a density different from that of the fluid initially in the feed line). Also a long time may be required to fill the feed line and distributor at low flow rates. This can vary the time at which reactants arrive at the distributor orifices. When multiple reactants are being delivered and their simultaneous arrival at the start of the reaction is critical to the reaction, axial mixing can also decrease the quality and yield of the desired reaction product.

Another common drawback of conventional distribution apparatus is that the liquid or fluid feed is not uniformly distributed in the vessel. Consequently, for chemical reactions that require uniform distribution to form the desired reaction product, the product yield or quality is poor. If the feed rate decreases and the pressure loss through the orifices in a conventional distributor is less than or approximately equal to variations in the pressure field created by the agitator of the mixing vessel, uneven distribution of reactant flow can occur, and in the worst case back flow occurs into the distributor, with detrimental effect on the reaction product.

SUMMARY OF THE INVENTION

Unlike conventional distributing apparatus, the apparatus of the invention can function over a broad range of flow rates. It distributes the fluid uniformly to the mixing or reaction zone at high or low flow rates and avoids or reduces the risk of back flow at low flow rates. Consequently, the apparatus is versatile and can be used for different kinds of reactions and processes that require different flow rates for feed streams.

The apparatus of the invention includes a distributor for delivering fluid feed stream to a mixing region or a reaction region. The distributor comprises a series of annular conduits which are positioned concentrically and close to the mixing or reaction region. These conduits provide multiple sets of orifices which can be included or omitted from the flowpath as the flow rate varies. Each annular conduit communicates with a plurality of orifices which are spaced circumferentially and symmetrically and each orifice is positioned to deliver a fluid substream to the mixing or reaction region. The apparatus also includes a feed line for delivering liquid to the distributor and branch lines connecting the feed line with each annular conduit. The flow of liquid to each conduit through the branch lines is controlled selectively by valves and each conduit with associated orifices has a different resistance to the flow of fluid.

A broad flow rate range is made possible by providing two or more of such annular conduits and associated orifices, with each conduit being adapted to handle a particular flow rate range that adjoins or overlaps the flow rate range of the others. As a consequence, very broad overall flow rate ranges can be accommodated. A high velocity is maintained for each such conduit and axial mixing and transit times are minimized. Most importantly, for any given operating conditions a substantially uniform and equal flow rate is obtained at each distributor orifice which feeds fluid to the mixing or reaction region. This also reduces or eliminates the risk of back flow.

In the method of the invention, a liquid stream is distributed into a mixing or reaction zone and, at a relatively low flow rate of said stream, the stream is directed only through a first annular distributing means of relatively high flow resistance.

At a relatively higher flow rate, a branch of the stream is directed through the first distributing means and another branch of the stream is distributed through a second annular distributing means of relatively lower flow resistance.

Multiple substeams are distributed from each annular conduit or conduits into the mixing zone at substantially equal and uniform flow rates from circumferentially and symmetrically spaced positions.

THE DRAWINGS

The invention will be described in more detail by reference to the drawings, of which:

DETAILED DESCRIPTION OF THE INVENTION

The apparatus of the invention is useful in the manufacture of photographic emulsions wherein a silver salt is precipitated by mixing a stream of silver nitrate solution with a stream of alkali metal halide solution in a gelatin solution. For convenience, the apparatus will be described with reference to such a process. It should be understood, however, that the apparatus is useful in a wide range of processes requiring the homogeneous and uniform mixing of fluids (liquid and gases), including processes in which a chemical reaction occurs and those in which there is no reaction such as a colloidal dispersion.

Figure 1:
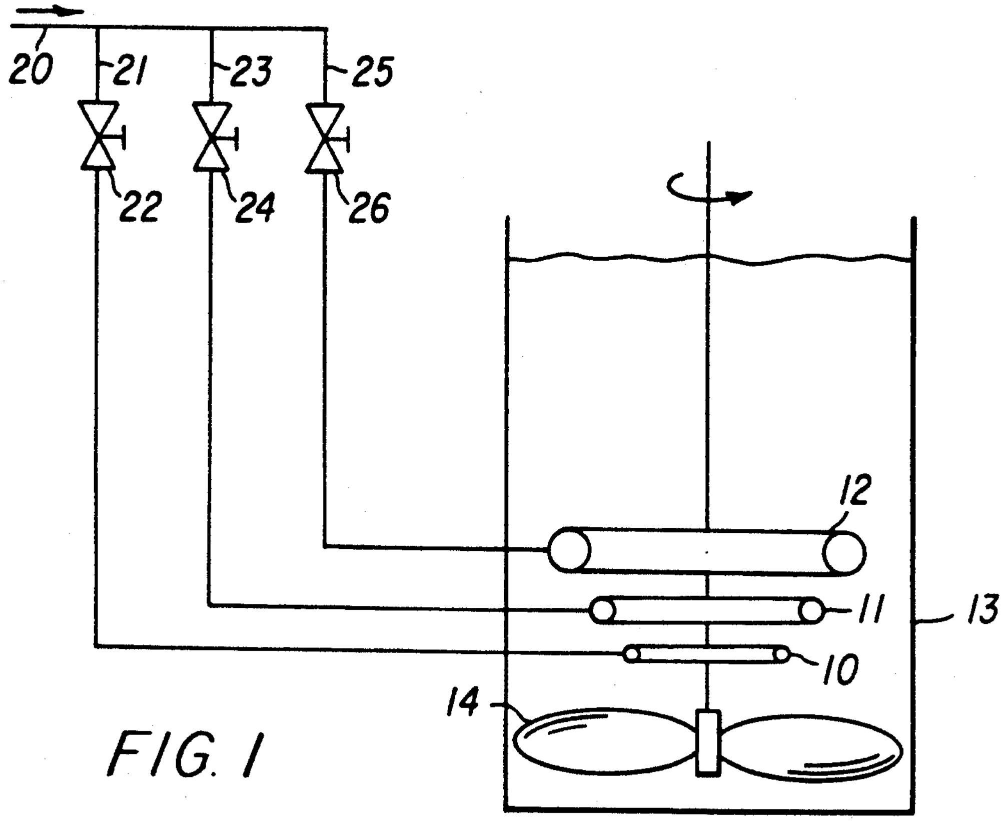
FIG. 1 is a schematic diagram of a fluid distributing apparatus of the invention having three annular distributor conduits positioned in sequence vertically above a rotating agitator in a vessel.

FIG. 1 is a schematic representation of an apparatus which can be referred to for a simplified explanation of the apparatus and method of the invention. Although in certain embodiments of the invention at least two separate reactant streams are fed to a mixing vessel, FIG. 1 illustrates an embodiment in which only one liquid stream is fed. In FIG. 1 a distributor apparatus of the invention, comprising three annular conduits 10, 11 and 12, is positioned in a mixing vessel 13 above a high-speed rotating agitator or impeller 14 driven by a motor, not shown. Symmetrically and circumferentially spaced about the lower portion of each annular conduit are orifices (not shown in FIG. 1), ranging in number, for example, from eight in the lower conduit 10 to forty-eight in the upper conduit 12.

In the operation of the mixing apparatus of FIG. 1, a solution of silver nitrate is fed by line 20 which connects via line 21 and valve 22 with annular conduit 10, via line 23 and valve 24 with conduit 11 and via line 25 and valve 26 with conduit 12.

By virtue of its smaller cross sectional area and smaller number of orifices, conduit 10 has a flow resistance substantially greater than that of the larger conduit 11, which in turn has greater flow resistance than the still larger conduit 12 which has the largest number of orifices. As a consequence, for the same inlet pressure, the flow rate is greatest for conduit 12, next greatest for conduit 11, and least for conduit 10. Hence, it is possible to employ conduit 10 at relatively low flow rates and still have sufficient pressure drop at its orifices to maintain uniform and equal flow rate at each orifice and avoid back flow resulting from the variations in the pressure field created in the mixing vessel by the rotating agitator 14.

The capability of the apparatus of the invention for operating over a wide range of reactant flow rates is made possible by the described series of annular conduits and valved lines. Thus, if a small batch of product is to be made or if the addition rate is required to be low, valves 24 and 26 are closed and valve 22 is opened. This permits flow of the reactant stream from feed line 20 to the lower conduit 10 only. Because of its relatively high flow resistance, even a very low reactant flow rate can produce a sufficient pressure drop at its orifices to force the reactant stream uniformly into the pressure field of the mixer.

When the addition rate must be higher, valve 24 is opened to cause the reactant stream to flow to both conduit 10 and conduit 11. Because of the symmetrical and circumferential positioning of the orifices, the reactant stream will continue to be fed uniformly into the mixing region and pressure field created by the rotating agitator 14. Finally, when the highest flow rate is desired, valve 26 is opened and the reactant stream flows to all three conduits 10, 11 and 12. This is done when the reactant flow rate is sufficiently high to create a sufficient pressure drop at the orifices of all three conduits. In this way, uniform distribution is achieved and back flow is avoided.

Figure 2:
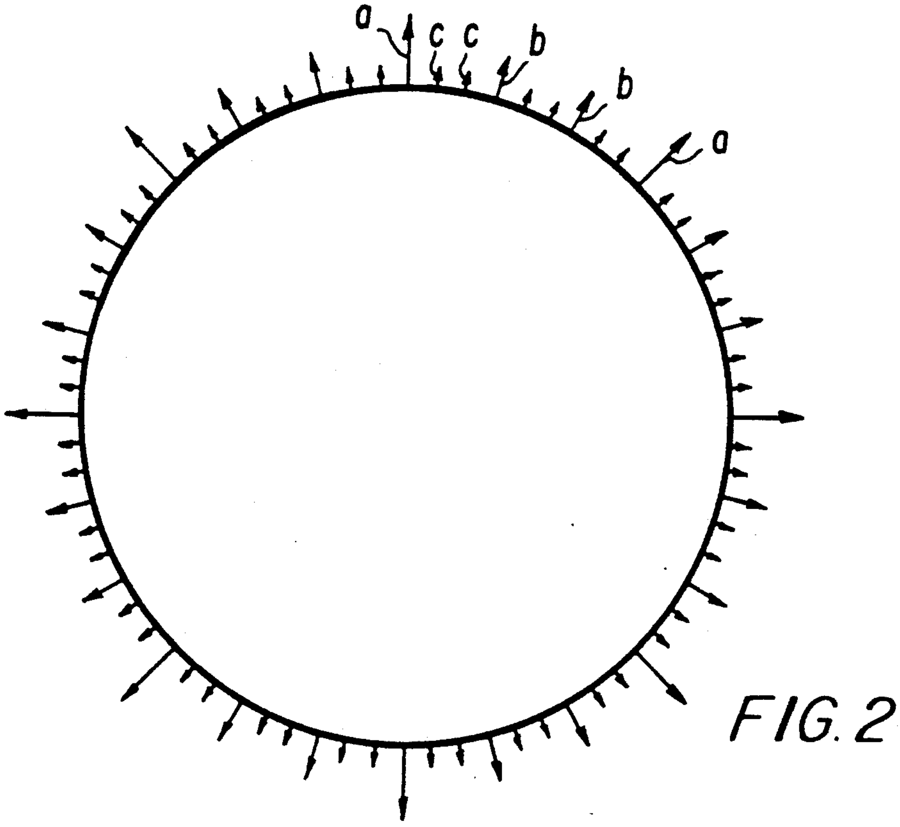
FIG. 2 is a diagrammatic illustration of the circumferential positioning of orifices in a series of annular distributor conduits in the apparatus of the invention.

FIG. 2 illustrates diagrammatically the circumferential and symmetrical spacing of the orifices in a distributor as in FIG. 1 which comprises three annular conduits. The longest arrows, a, represent streams issuing from the eight orifices in annular conduit 10. Arrows, b, of medium length represent the streams from sixteen circumferentially and symmetrically spaced orifices of conduit 11. The short arrows, c, represent the streams from the forty-eight circumferentially and symmetrically spaced orifices of conduit 12. In this preferred arrangement, two orifices of an annular conduit are circumferentially spaced between two orifices of the next larger conduit.

Figure 3:
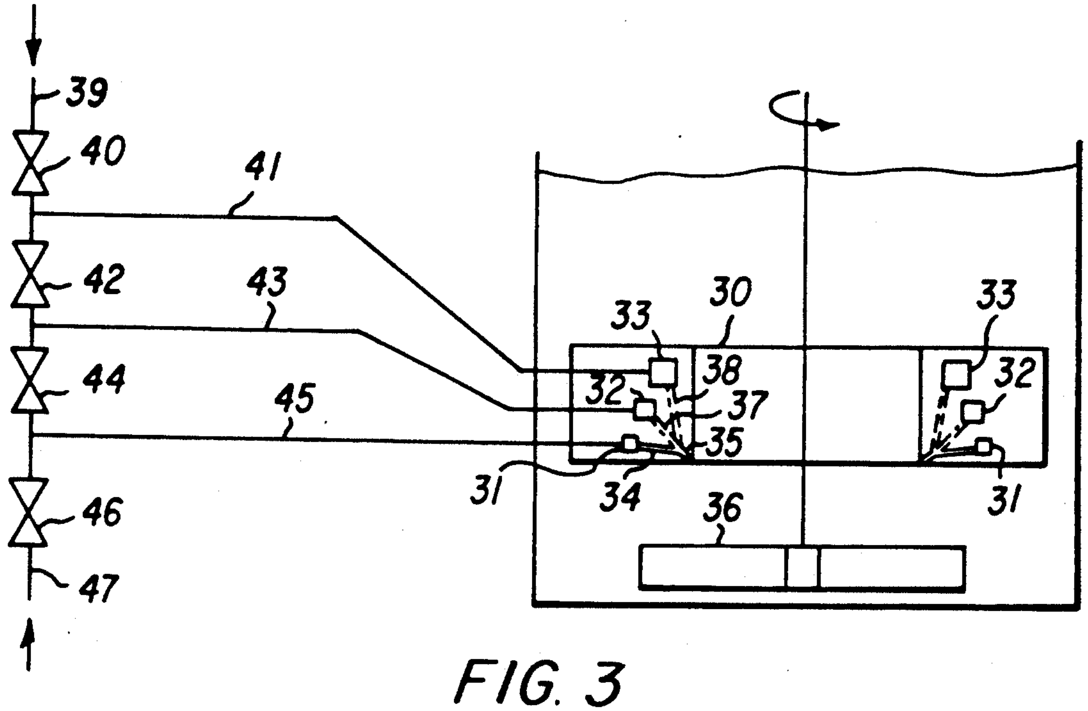
FIG. 3 is a schematic diagram of an apparatus of the invention in which a housing containing separate annular distributor conduits is positioned above a rotating agitator in a vessel.

FIG. 3 illustrates diagrammatically a preferred form of the apparatus of the invention in which the annular conduits are integrally positioned in a block or housing 30. The figure illustrates an embodiment in which conduit 31, has a greater resistance to flow than conduits 32 and 33 because of its smaller cross-sectional area. The figure also shows that the cross-sectional area of the conduits need not be circular as in FIG. 1 but can be rectangular or of other shapes.

FIG. 3 also illustrates the connecting of each annular conduit to a plurality of orifices which distribute liquid to the mixing region. For example conduit 31 is connected by a connecting passage 34 to an orifice 35 which directs liquid toward the agitator means 36. Likewise orifices (not shown in the drawing) are connected to conduits 32 and 33 by passages 37 and 38, respectively.

For simplicity of illustration in FIG. 3 which shows cross sections of the annular conduits 31, 32 and 33, the connecting passages 34, 37 and 38 are shown in a common plane. It should be understood, however, that since the conduits are annular and since the connecting passages and orifices are positioned around the circumference of each conduit, and are spaced between each other, as indicated in FIG. 2, a true cross section would show connecting passage for only one of the annular conduits, each such passage leading to only one orifice as, for example, passage 34 being connected with orifice 35.

Also shown in FIG. 3 is purge stream line 39 which connects via valve 40 with branch line 41, via valve 42 with branch line 43 and via valve 44 with branch line 45.

In operating the apparatus of FIG. 3 for feeding a liquid stream at a low flow rate to the mixing vessel, the valves 40, 42 and 44 are closed and valve 46 is opened. A feed stream, for example, a solution of silver nitrate is fed at a constant flow rate via feed line 47 and branch line 45 to the annular conduit within distributor housing 30 which has the highest resistance to flow, namely, conduit 31. The liquid, which preferably is pumped by a positive displacement metering pump, flows through the annular conduit 31 and then via the corresponding connecting passage such as passage 34 to the respective orifices, such as orifice 35, which direct the liquid toward the agitator means 36.

When a higher flow rate of the liquid stream from line 47 is desired, valve 44 is opened. This causes the liquid to flow to branch line 43 as well as to branch line 45 and thence to conduits 31 and 32 for distribution through connecting passages to the orifices. By opening the flow to two conduits a higher flow rate is accommodated while maintaining about the same desired pressure in the conduits and the same pressure drop across the orifices of each conduit.

When an even higher flow rate is desired, valve 42 is also opened. This permits the flow of liquid to the third conduit 33. In this manner all three conduits are employed to handle the maximum flow rate at an acceptable pressure. Thus, as higher or lower flows are required, the valves to the conduits can be opened or closed.

It should be noted that branch lines 41,43 and 45 are of varying diameter or cross-sectional area, such that high velocity of the fluid is always maintained in each selected line regardless of flow rate. In order to maintain an equal pressure drop in each of the branch lines, restrictive orifices may be employed in the large diameter lines to compensate for larger frictional losses in the smaller diameter lines.

To minimize reaction of materials in the channels of the distributor, the feed line, branch lines, conduits, connecting passages and orifices can be purged before valves are opened or immediately after closing them. Purging can be accomplished with an inert liquid, e.g., water for silver halide precipitations, introduced by purge line 39. For some types of mixing the purge line valves can be opened or closed while reactant streams continue to flow to the mixing vessel. For others, the valve closing or opening takes place while the main feed line is closed.

Figure 4:
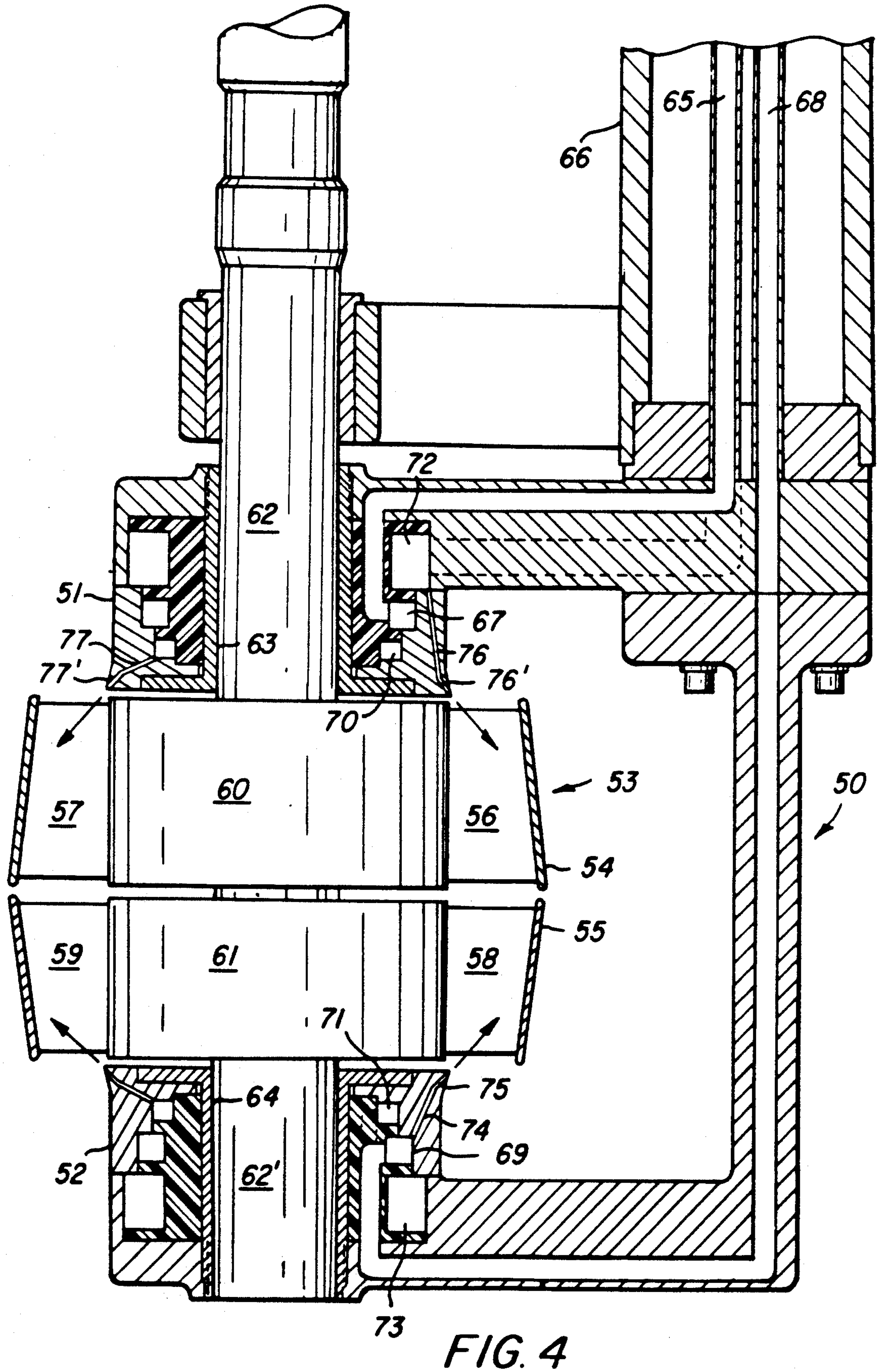
FIG. 4 is a side view, partly in section, of an apparatus of the invention comprising two sets of distributor conduits, one positioned above and one below a mixing region generated by a rotating agitator.

FIG. 4 of the drawings illustrates in more detail a distributor means for the apparatus of the invention employed with commercially available type of high speed rotating agitator. This distributor means 50 comprises two matched distributors 51 and 52. The former is positioned axially above and the latter axially below the rotating agitator means 53. The latter comprises two hollow frusto-conical members 54 and 55. Member 54 is connected by vanes 56 and 57 and member 55 is connected by vanes 58 and 59 to cylindrical bases 60 and 61, the latter being mounted on and rotating with the rotatable shaft 62. The shaft 62 and its extension 62′ pass through axial journals or sleeves 63 and 64 in distributors 51 and 52.

In operation a first liquid stream such as a silver nitrate solution is fed via line 65 mounted in housing 66 to annular conduit 67 of distributor 51. At the same time a second liquid stream such as a potassium bromide solution, to be mixed with the first stream is fed via line 68, also mounted in housing 66, to annular conduit 69 of the distributor 52.

Although not shown in this figure of the drawing it should be understood that, in addition to the flow through conduits 67 and 69, the liquid streams can also be fed at the same time via a line not visible in this cross section of the apparatus to the smaller conduits 70 and 71. If the flow rate is sufficiently high the stream can also flow to the largest conduits 72 and 73. These lines leading to the various conduits are of varying diameter or cross-sectional area in order to maintain sufficiently high velocity in the line. In any event, the liquid in the middle conduit 69 of distributor 52 flows via connecting passage 74 and orifice 75, and through other passages and orifices spaced circumferentially about the housing for conduit 69 which are not visible in this cross section, into the rotating agitator 53. Likewise, the largest conduit 72 directs the flows of liquid via connecting passages and orifices such as 76 and 76′ and from the smallest conduit 70 via connecting passages and orifices such as 77 and 77′ directly into the rotating agitator 53.

Figure 5:
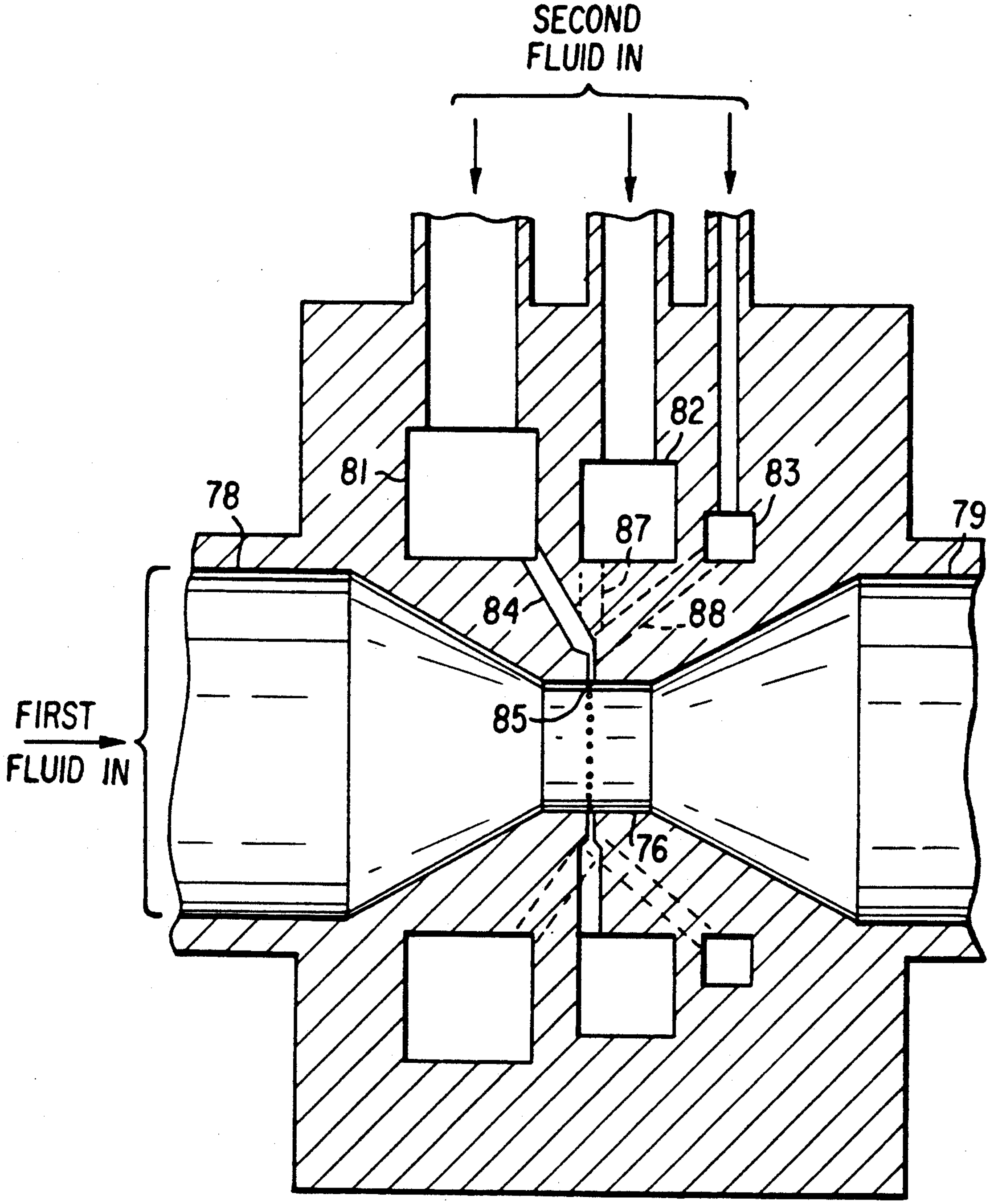
FIG. 5 is a schematic diagram of an apparatus of the invention comprising a set of distributor conduits positioned near a mixing or reaction region generated by a static mixer.

Although the distributor means of the invention is useful in a mixing apparatus which includes a rotating agitator as in FIGS. 1, 3, and 4 it should be understood that the novel distributor can also be used with advantage for delivering liquid streams to a static mixer. FIG. 5 shows schematically such an embodiment, wherein the mixer is a venturi mixer. A first fluid stream is fed by inlet line 78 to outlet line 79 by way of the venturi constriction 76 where turbulent flow occurs. A second fluid stream is fed into the fluid liquid stream at the constriction 76. The second fluid stream is delivered by a distributor of the invention, which functions similarly to the distributor embodiments previously described herein. The embodiment of the invention shown in FIG. 5 includes three annular conduits 81, 82 and 83 and connecting passages 84, 87 and 88. The connecting passages lead to orifices spaced around the venturi 76 as shown in FIG. 2. It should be understood, that since the conduits are annular and since the connecting passages and orifices are positioned around the circumference of each conduit and are spaced between each other as in FIG. 2, a true cross section would show connecting passages for only one of the annular conduits, each such passage leading to only one orifice, for example connecting passage 84 leading to orifice 85. Thus, at low flow rates for the second stream, a small conduit 83 delivers the liquid to the venturi mixer via connecting passages and orifices of the conduit of small cross sectional area. At higher flows, the intermediate sized conduit 82 and its passages and orifices are included in the flow path and at still higher rates, the largest conduit 81 and its passages and orifices are included. As with other embodiments of the invention, this structure ensures uniform flow rates from each of the plurality of orifices which are equally spaced about the constricted mixing region and avoids or reduces the risk of back flow.

Figure 6:
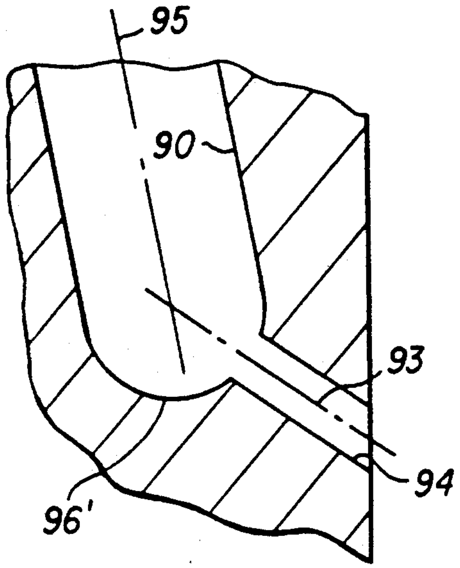
FIG. 6 is an enlarged sectional view of a portion of the apparatus of FIG. 4 showing a passage which connects a conduit with an orifice.
Figure 7:
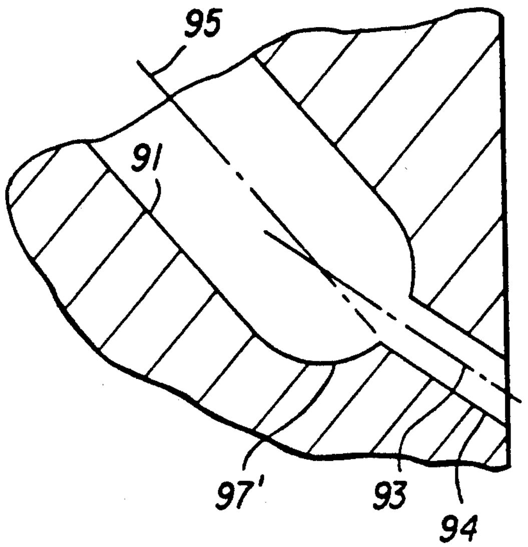
FIG. 7 is an enlarged sectional view of a portion of the apparatus of FIG. 4 showing a passage which connects a conduit with an orifice.
Figure 8:
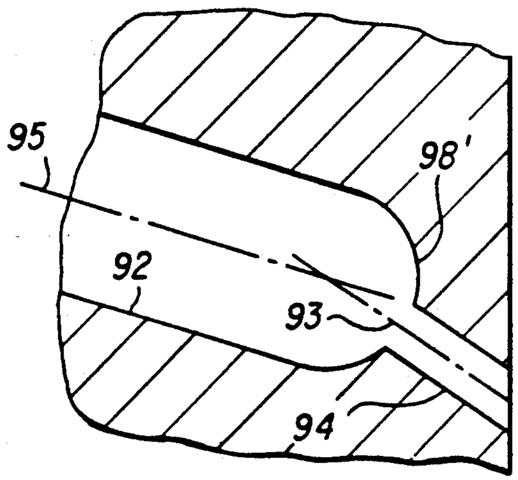
FIG. 8 is an enlarged sectional view of a portion of the apparatus of FIG. 4 showing a passage which connects a conduit with an orifice.

FIGS. 6, 7 and 8 show a further detail of preferred embodiments of the distributor means of the invention which contributes to achieving approximately equal flow rates from each of the orifices. They show a preferred way of joining connecting passages from the annular conduits with the respective orifices, the latter being of smaller diameter. As previously explained, the annular conduits, such as conduits 67, 70 and 72 in FIG. 4 can be located in different planes relative to the orifices such as orifices 76' and 77' in FIG. 4, which orifices are located in a common plane with common exit trajectories and are identical for all conduits. Therefore, the connecting passages will have different lengths and different angles of intersection with the orifices. To minimize the effect of these differences on the uniformity of flow from the orifices fed by different annular conduits, the preferred embodiments illustrated in FIGS. 7, 6 and 8 have certain characteristics. One is that the ratio of length to diameter of the connecting passages 90, 91 and 92, which originate at different annular conduits, is relatively small or, in other words, the diameter of the passages is reasonably large. More specifically, the diameter must be large enough so that the pressure losses in the connecting passages are substantially less than the pressure losses in the smaller diameter orifices. Since the lengths of the passages usually are different when originating from different annular conduits, the diameter of the passage either must vary to provide equal frictional loss or the diameter of each connecting passage must be large enough that the frictional loss differences resulting from length differences are negligible.

Another characteristic of the preferred embodiment illustrated by FIGS. 6, 7 and 8 is that the intersection of each connecting passage and orifice is similar for all orifices regardless of the originating annular conduit. If the intersections are not similar in structure, differences in entrance pressure losses into the orifices will cause differences in the flow rate from each orifice. To provide similar entrance losses into the orifices in accordance with the invention, a spherical tip is provided at the downstream end of each connecting passage. Each connecting passage and the corresponding orifice into which it feeds liquid are positioned so that, as shown in the drawings, the centerline 93 of orifice 94 intersects the centerline 95 of the connecting passage 90 at the center of the spherical tip 96'. FIGS. 6, 7 and 8 show the three passages 90, 91 and 92, each having this structural relationship with its corresponding orifice. With this structure the entrance pressure losses at the entrance to each orifice are substantially equal.

Figure 9:
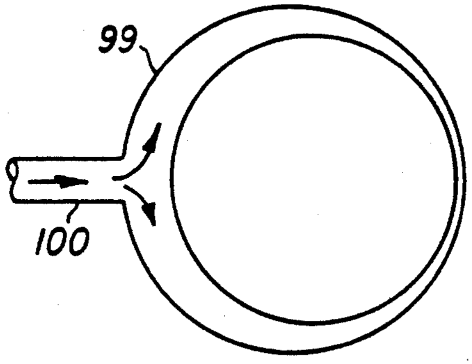
FIG. 9 is a schematic top view showing an annular conduit having a tapered cross-sectional area along its circumference.

FIG. 9 shows a preferred structure for the annular conduits in accordance with the invention. In this preferred embodiment the annular conduit 99, which represents all of the annular conduits, has a cross-sectional area which tapers uniformly from a first position of connection with the branch line 100 to a second position opposite from said first position. Preferably, both the width and the height of each of the conduits are tapered. Since the cross-sectional area is reduced as flow proceeds around the annular conduit from the branch line 100, the liquid velocity is maintained almost constant despite the loss of flow from the conduit as the liquid discharges through each of the circumferentially spaced connecting passages and orifices.

Advantages of the diminishing cross-sectional area as shown in FIG. 9 include the following: 1) Since the total volume of the annular conduit is reduced as compared with a conduit of uniform cross section, less time is required to purge inert fluid from the conduit at the start of liquid flow to the mixing apparatus. 2) The velocity of liquid flowing within the annular conduits can be maintained at a constant and relatively high level, so that turbulent flow can be maintained and density inversions can be avoided. 3) The nearly constant velocity allows substantially uniform distribution of flow to each connecting passage and orifice. 4) Cleaning solutions can be circulated through the conduits at relatively high velocities to provide effective cleaning.

Although the drawings show apparatus of the invention having three annular conduits, it should be understood that some benefits of the invention can be obtained with only two such conduits and that more than three can be used if desired. However, three conduits provide a good balance between adaptability to a wide range of flow rates and simplicity and compactness of construction.

The apparatus of the invention preferably is constructed of materials that are not adversely affected by the chemical and electro-chemical environment in which it is used. For silver halide preparations the preferred material is titanium or other non-corrosive material. In the apparatus of FIG. 4, the housing for the annular conduits, connecting passages and orifices is made of a non-conductive engineering plastic, e.g., such as "Noryl" a polymer available from General Electric Co., or "Lexan" also available from General Electric Co., however other polymers may work equally well.

This invention has been described in detail with particular reference to preferred embodiments thereof, but it will be understood that variations and modifications can be effected within the spirit and scope of the invention.

We claim:

1. A fluid distributing apparatus for delivering fluid to a region comprising:

a plurality of annular conduits positioned concentrically and proximate to the region;

each of said plurality of conduits having a plurality of orifices spaced circumferentially and symmetrically and each being positioned to deliver a fluid stream toward the region, wherein the number of orifices for each conduit is related to the size of the conduit with respect to other conduits, the conduit of the largest cross section having the most orifices and the conduit of the smallest cross section having the fewest;

a plurality of branch lines, each branch line connecting with one of said annular conduits;

a feed line connecting with each of said plurality of branch lines, said feed line capable of delivering fluid;

valve means in each branch line for controlling the flow of fluid selectively to each of said annular conduits;

and each of said annular conduits having a different resistance to the flow of liquid through the orifices thereof.

2. An apparatus of claim 1 wherein the annular conduits are arranged in sequence according to their flow resistances and wherein the conduit of greatest flow resistance has the smallest number of orifices and each successive conduit of lower flow resistance has a larger number of orifices than the one preceding it.

3. An apparatus of claim 1 wherein each of the plurality of branch lines connected to each annular conduit has a different resistance to flow of the fluid therethrough.

4. An apparatus of claim 1 wherein the cross-sectional areas of the orifices in each annular conduit are sufficiently small to create a pressure drop from the conduit into the vessel which is substantially greater than the pressure variations existing in the region.

5. An apparatus of claim 1 comprising at least three of said annular conduits, the conduits being of different cross-sectional areas.

6. An apparatus of claim 1 wherein two orifices of an annular conduit are circumferentially spaced between two orifices of the next larger conduit.

7. An apparatus of claim 6 wherein the numbers of orifices in the sequence of conduits proceeding from that of greatest to that of least flow resistance are 8, 16 and 48, respectively.

8. An apparatus according to claim 1 wherein the flow resistances of each of the orifices are approximately equal.

9. An apparatus according to claim 1 wherein the conduits are positioned in a housing having an outer cylindrical surface which is in close proximity to the region, and wherein the housing also encloses connecting passages and orifices, and wherein a connecting passage leads from a conduit to each orifice, said orifices having openings on the outer surface of said housing, said openings being positioned circumferentially and equally spaced apart from the region.

10. An apparatus according to claim 9 wherein the diameter of the connecting passages is sufficiently large relative to the length of the passages that all the passages, regardless of length, have approximately the same resistance to flow and that said diameter is larger than the diameter of the orifices, each such passage having a downstream end terminating in a hemispherical configuration which connects with an orifice, the centerline of said orifice crossing the center line of the connecting passage at the center of said hemispherical configuration.

11. An apparatus of claim 1 wherein the orifices of each annular conduit direct the flow of liquid directly into the region.

12. An apparatus of claim 1 wherein the valve means are arranged so as to permit the flow of fluid only to the annular conduit of the smallest cross-sectional area and to permit the opening of flow to each of the other conduits as selected.

13. An apparatus according to claim 1 wherein each of said annular conduits has a position of connection with a branch line and each such conduit has a cross section which tapers uniformly in area from a first position of connection with the branch line to a second position opposite from said first position.

14. The apparatus of claim 1 wherein the pressure drop within each of said branch lines is equalized.

* * * * *